US008516005B2

(12) United States Patent
Ergan et al.

(10) Patent No.: US 8,516,005 B2
(45) Date of Patent: *Aug. 20, 2013

(54) COMPRESSED STORAGE MANAGEMENT

(75) Inventors: Cenk Ergan, Bellevue, WA (US); Mehmet Iyigun, Bellevue, WA (US); Yevgeniy Bak, Redmond, WA (US); Benjamin A. Mickle, Bellevue, WA (US); Alexander Kirshenbaum, Redmond, WA (US); Landy Wang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/006,229

(22) Filed: Jan. 13, 2011

(65) Prior Publication Data

US 2011/0113432 A1    May 12, 2011

Related U.S. Application Data

(63) Continuation of application No. 11/933,364, filed on Oct. 31, 2007, now Pat. No. 7,895,242.

(51) Int. Cl.
*G06F 7/00*      (2006.01)
*G06F 17/30*     (2006.01)

(52) U.S. Cl.
USPC .......................................... 707/802; 707/803

(58) Field of Classification Search
None
See application file for complete search history.

(56) References Cited

U.S. PATENT DOCUMENTS

| 5,696,926 | A | 12/1997 | Culbert |
| 5,758,174 | A | 5/1998 | Crump |
| 6,330,572 | B1 * | 12/2001 | Sitka ............................ 707/608 |
| 6,349,372 | B1 | 2/2002 | Benveniste |
| 6,516,397 | B2 | 2/2003 | Roy |
| 6,564,305 | B1 | 5/2003 | Moore |
| 6,877,081 | B2 | 4/2005 | Herger |
| 6,956,507 | B2 | 10/2005 | Castelli et al. |
| 6,968,424 | B1 | 11/2005 | Danilak |
| 7,024,512 | B1 | 4/2006 | Franaszek |
| 7,698,513 | B2 | 4/2010 | Sechrest et al. |
| 7,895,242 | B2 | 2/2011 | Ergan |
| 8,386,740 | B2 | 2/2013 | Devendra et al. |
| 2002/0073298 | A1 | 6/2002 | Geiger et al. |
| 2003/0079081 | A1 | 4/2003 | Okada |
| 2004/0030847 | A1 | 2/2004 | Tremaine |
| 2005/0132161 | A1 * | 6/2005 | Makela et al. ................. 711/170 |
| 2007/0005911 | A1 | 1/2007 | Yang |
| 2009/0112949 | A1 | 4/2009 | Ergan |

OTHER PUBLICATIONS

"Non-Final Office Action", U.S. Appl. No. 11/933,364, (Jul. 22, 2010),10 pages.
"Notice of Allowance", U.S. Appl. No. 11/933,364, (Nov. 16, 2010),6 pages.

(Continued)

*Primary Examiner* — Uyen Le
(74) *Attorney, Agent, or Firm* — Wolfe-SBMC

(57) ABSTRACT

Compressed storage management includes assigning a selection priority and a priority level to multiple data units stored in an uncompressed portion of a storage resource. The management can further include compressing data units and storing the compressed data units in a compressed portion of the storage resource. The data units in the compressed portion are stored in regions, which each store data units having the same selection priority or the same selection priority level.

20 Claims, 7 Drawing Sheets

(56) References Cited

OTHER PUBLICATIONS

De Castro, Rodrigo S., et al., "Adaptive Compressed Caching: Design and Implementation", IEEE, Retrieved from <http://linuxcompressed.sourceforge.net/docs/files/paper.pdf>, (2003), 15 pages.

Freedman, Michael J., et al., "The Compression Cache: Virtual Memory Compression for Handheld Computers", *MIT Lab for Computer Science*, Retrieved from <http://www.scs.stanford.edu/mfreed/docs/6.033/compression.pdf>, (Mar. 16, 2000), 16 pages.

Tuduce, Irina C., et al., "Adaptive Main Memory Compression", Retrieved from <http://www.lst.int.ethz.ch/research/publications/publications/USENIX_2005/USENIX_2005.pdf>, (2005), 14 pages.

Wilson, Paul R., et al., "The Case for Compressed Caching in Virtual Memory Systems", *USENIX Association*, Jun. 6-11, 1999. Retrieved from <http://www.usenix.org/events/usenix99/full_papers/wilson/wilson.pdf>, (1999), 33 pages.

"Understanding Memory Resource Management in VMware ESX 4.1", Retrieved from perf <http://www.vmware.com/files.pdf/techpaper/vsp_41_perf_memory_mgmt.pdf> on Mar. 21, 2013, (2010), 25 pages.

Carp, ALex "The Standby List and Storage Overprovisioning", Retrieved from <http://fsfilters.blogspot.in/2012/04/standby-list-and-storage.html> on Mar. 22, 2013, (Apr. 19, 2012), 5 pages.

Gupta, Nitin "Compcache: In-Memory Compressed Swapping", Retrieved from <http://lwn.net/Articles/334640/> on Mar. 20, 2013, (May 26, 2009), 6 pages.

Russinovich, Mark "Inside the Windows Vista Kernel: Part 2", Retrieved from <http://technet.microsoft.com/en-us/magazine/2007.03.vistakernel.aspx> on Mar. 21, 2013, (Mar. 2007), 8 pages.

Tuduce, Irina "Adaptive Main Memory Compression", Doctoral Dissertation, Swiss Federal Institute of Technology Zurich, Available at <http://www.lst.ethz.ch/research/publications/DISS_ETH_16327/DISS_ETH_16327.pdf>, (2005), 141 pages.

\* cited by examiner

COMPRESSED STORAGE MANAGEMENT

RELATED APPLICATION

This application is a continuation of and claims priority to U.S. patent application Ser. No. 11/933,364 filed Oct. 31, 2007, now U.S. Pat. No. 7,895,242, entitled "Compressed Storage Management" to Ergan et al., the disclosure of which is incorporated by reference herein in its entirety.

BACKGROUND

Computer processor technology is rapidly advancing, resulting in continually increasing processor performance. The performance of such processors, however, is sometimes hindered by other bottlenecks in the computer. For example, the speed of data transfer from hard disk drives into random access memory (RAM) is a bottleneck in computer performance. One way to reduce the impact of bottlenecks in the computer is to store more data in RAM. However, the cost of RAM remains high enough that it is typically cost prohibitive to use very large amounts of RAM in computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, management of a storage resource in a system includes determining which of multiple data units stored in an uncompressed portion of the storage resource are to be compressed and stored in a compressed portion of the storage resource, resulting in increasing the size of the compressed portion. The management further includes returning one or more regions of the compressed portion for use in the uncompressed portion in response to storage resource pressure in the system, as well as compacting regions in the compressed portion to fill empty gaps in the compressed portion.

In accordance with one or more other aspects, the compressed storage management includes analyzing data access and usage patterns of multiple data units stored in an uncompressed portion of the storage resource. This analysis includes identifying compression ratios of each of the multiple data units, identifying how recently each of the multiple data units was most recently accessed, and identifying how frequently each of the multiple data units was accessed. One or more of the multiple data units are selected based at least in part on this analyzing. Each of these selected data units is retrieved from the uncompressed portion of the storage resource, compressed, optionally processed in other ways (such as encryption etc.), and stored in the compressed portion of the storage resource.

In accordance with one or more other aspects, the compressed storage management includes reducing a size of a compressed portion of a storage resource in a system. This reducing includes analyzing storage resource pressure in the system and checking whether the storage resource pressure exceeds a threshold amount. If the storage resource pressure exceeds this threshold amount, then one or more data units are released from the compressed portion, and one or more regions of the compressed portion are returned to a resource manager.

BRIEF DESCRIPTION OF THE DRAWINGS

The same numbers are used throughout the drawings to reference like features.

DETAILED DESCRIPTION

Compressed storage management is discussed herein. A storage resource in a system is separated into two portions: an uncompressed portion and a compressed portion. Blocks of data from the uncompressed portion are selected, compressed, optionally processed in other manners (e.g., encrypted, authenticated, etc.), and stored in the compressed portion. By compressing and storing the selected blocks of data, the amount of data that can be stored by the storage resource is increased. Additionally, the size of the compressed portion can vary during operation in response to resource pressure in the system.

Figure 1:
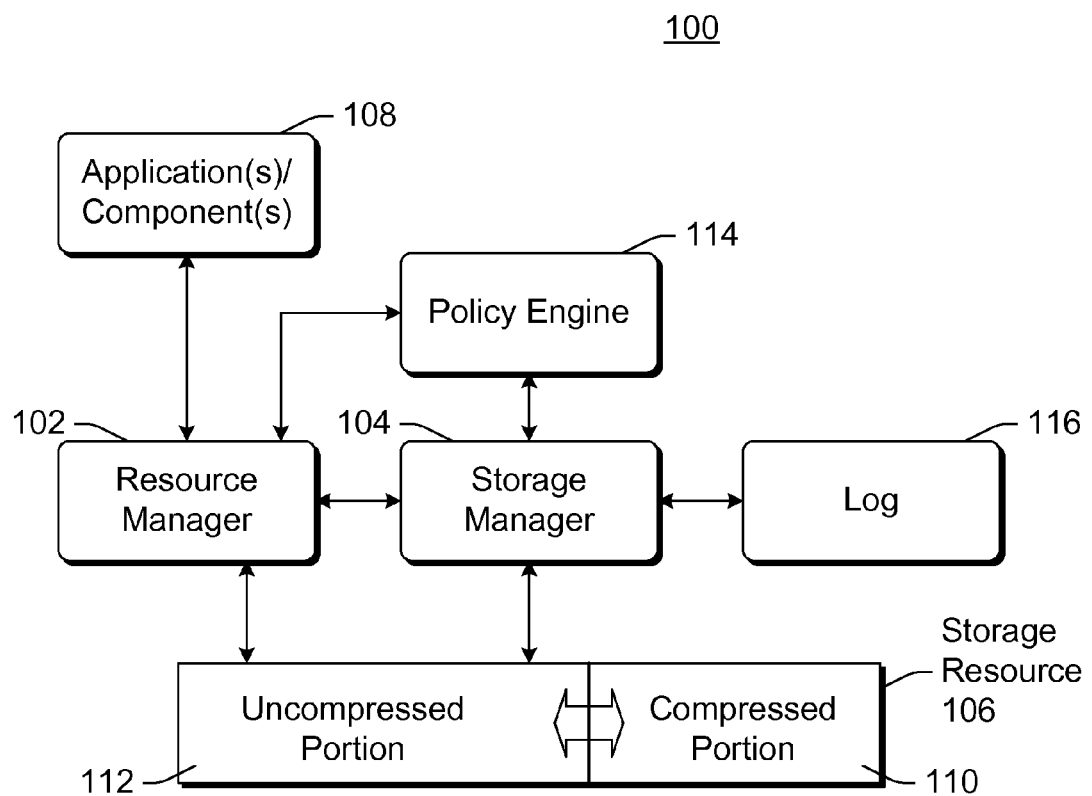
FIG. 1 illustrates an example system employing compressed storage management techniques in accordance with one or more embodiments.

FIG. 1 illustrates an example system 100 employing compressed storage management techniques in accordance with one or more embodiments. System 100 includes a resource manager 102, a storage manager 104, and a storage resource 106. Generally, resource manager 102 manages storage of data in storage resource 106. Resource manager 102 allocates portions of storage resource 106 to various applications or components 108 in system 100. Resource manager 102 can receive requests from these applications or components to retrieve data from storage resource 106 and to write data to storage resource 106. Resource manager 102 also allocates a portion of resource 106 to storage manager 104 for storage of data in compressed form, as discussed in more detail below.

System 100 represents one or more devices. In one or more embodiments, the components 102-116 illustrated in system 100 are included as part of the same computing device. Alternatively, the components can be spread across two or more devices. For example, storage resource 106 may be one device (e.g., a removable Flash memory device, a remote computing device, etc.) while the remaining components of system 100 are implemented on a different device.

Storage resource 106 can be any of a variety of different storage resources, such as memory (e.g., RAM or Flash memory), a file, a buffer pool of a database application, records of email messages in a mail store for an email application, and so forth. In one or more embodiments, storage resource 106 is RAM, and resource manager 102 is a memory manager. Storage resource 106 can also be a cache made up of RAM or another type of storage resource, in which case storage manager 104 can also be referred to as a cache manager. It should also be noted that storage resource 106 can be a single device, or alternatively implemented across multiple devices. For example, storage resource 106 could be a "volume" that is stored (e.g., striped) across multiple disks in a RAID (Redundant Array of Independent Drives) system.

Resource manager 102 allocates portions of storage resource 106 to requesting applications or components, and manages accesses to storage resource 106. Resource manager 102 also optionally manages paging of storage resource 106. Paging separates data into units referred to as pages and uses one or more additional storage devices (e.g., a hard disk drive) to store pages when not in use. This paging allows for the use of virtual memory and can improve the performance of system 100. Such paging techniques are well-known to those skilled in the art.

Following the compressed storage management techniques discussed herein, storage manager 104 requests resource manager 102 to allocate a portion of storage resource 106 to manager 104 to use as a compressed cache. This allocated portion becomes compressed portion 110, which is also referred to as a compressed cache. Once compressed portion 110 is allocated to storage manager 104, resource manager 102 keeps a record of the portion of resource 106 that has been allocated to storage manager 104 and no longer directly accesses that portion. Resource manager 102 continues to manage uncompressed portion 112, but allows storage manager 104 to manage storage of data in compressed portion 110. If paging of resource 106 is supported by resource manager 102, resource manager 102 does not typically page compressed portion 110.

Resource manager 102 selects data from uncompressed portion 112 for inclusion in compressed portion 110. This selection can optionally be performed according to hints or commands received from policy engine 114, as discussed in more detail below. Storage manager 104 compresses the selected data and stores the compressed data in compressed portion 110. Storage manager 104 can also perform additional processing of the selected data. This additional processing can be encrypting the selected data (e.g., using symmetric key encryption, public key encryption, and so forth), generating error-detecting data such as CRC (cyclic redundancy check) data, generating authentication information such as HMAC (Hash Message Authentication Code) data, and so forth.

If an application or component 108 subsequently requests access to the data stored in compressed portion 110, resource manager 102 requests that data from storage manager 104. Storage manager 104 in turn retrieves the data from compressed portion 110, decompresses the retrieved data, and returns the decompressed data to resource manager 102. Any other processing that storage manager 104 performed on the selected data is also verified or undone before returning the data to resource manager 102, such as decrypting the data, verifying error-detecting data, verifying authentication information, correcting data (if possible) if this verification fails, and so forth. If error-detecting data or authentication information cannot be verified and/or the data corrected, then resource manager 102 is notified that the requested data has an error and cannot be returned. In one or more embodiments, resource manager 102 maintains a record of the data that has been selected for storage in compressed portion 110 so that resource manager 102 can readily determine whether requested data is stored by storage manager 104.

For example, assume that resource manager 102 is a memory manager and storage resource 106 is RAM. Resource manager 102 selects multiple pages from uncompressed portion 102 and notifies storage manager 104 of the pages that have been selected. Storage manager 104 compresses the selected pages and stores the compressed pages in compressed portion 110. When an application 108 subsequently requests access to a page that is not in uncompressed portion 112, resource manager 102 checks whether storage manager 104 has stored the page in compressed portion 110. If so, then resource manager 102 requests storage manager 104 to retrieve the requested page, and storage manager 104 in turn retrieves the compressed page from compressed portion 110, decompresses the page, and returns the decompressed page to resource manager 102. If storage manager 104 has not stored the page in compressed portion 110, then resource manager 102 obtains the page from its current location (e.g., on a hard disk drive). The pages stored in compressed portion 110 are stored in compressed form, so more pages can be stored in compressed portion 110 than could typically be stored if they were uncompressed. Storage manager 104 and compressed portion 110 thus provide a more efficient use of storage resource 106, and can reduce accesses to slower storage devices (e.g., hard disk drives).

It should be noted that resource manager 102 can retrieve data from compressed portion 110 at any time by requesting the data from storage manager 104. Resource manager 102 oftentimes makes such a request in response to a request for the data from an application or component 108, although resource manager 102 can also make the request for any of a variety of other reasons. Resource manager 102 returns the data to any requester (e.g., application or component 108 as discussed above), and can allow the data to remain in compressed portion 110 and/or can move the data from compressed portion 110 to uncompressed portion 112.

It should also be noted that a data unit that is in uncompressed portion 112 typically does not have a corresponding compressed version of the data unit in compressed portion 110. Keeping two versions of the same data unit (one version being uncompressed and one version being compressed) in storage resource 106 is typically not an efficient use of resource 106, so such situations are typically avoided.

Storage manager 104 stores data selected from uncompressed portion 112 into compressed portion 110. Storage manager 104 separates compressed portion 110 into different regions, and stores the compressed data into these regions. The size of a region can vary in different embodiments. In one or more embodiments, a region is 1 megabyte, although larger or smaller region sizes could alternatively be used.

Each data unit, such as a memory page, that is selected for storage in compressed portion 110 has a unique identifier assigned to it. This unique identifier can be assigned by any of various components, such as resource manager 102 or storage manager 104. The compressed version of the data unit will take up less space in resource 106 than the data unit itself, so the same data unit structure is not used by storage manager 104. For example, resource manager 102 may manage data as memory pages, but storage manager 104 would not.

Figure 2:
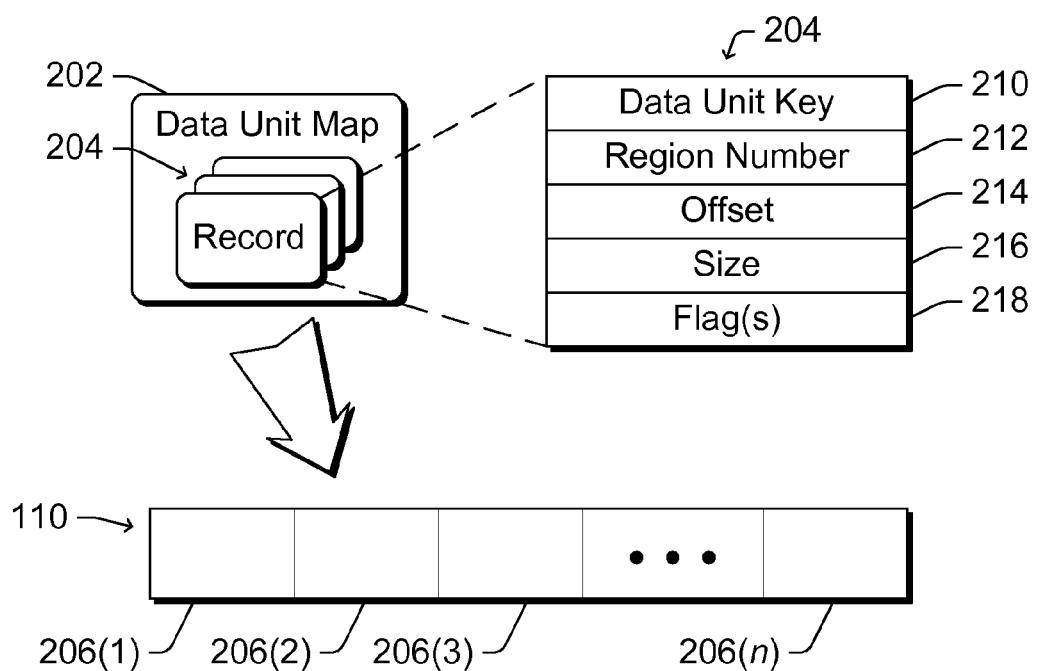
FIG. 2 illustrates an example data unit map in accordance with one or more embodiments.

Storage manager 104 maintains a data unit map to identify where in compressed portion 110 the various compressed data units are stored. FIG. 2 illustrates an example data unit map in accordance with one or more embodiments. For each compressed data unit stored in compressed portion 110, data unit map 202 maintains a corresponding record 204 identifying where that compressed data unit is stored in compressed portion 110. Compressed portion 110 is separated into one or more (n) different regions 206(1), . . . , 206(n).

Each record 204 includes a data unit key field 210, a region number field 212, an offset field 214, a size field 216, and a flag(s) field 218. Data unit key field 210 stores the unique identifier of the corresponding compressed data unit. This unique identifier can take any of a variety of different forms.

For example, it could be a file name and offset, a file identifier, a process identifier and virtual address, a record identifier, and so forth.

Region number field 212 stores an identifier of the particular region 206 in which the corresponding compressed data unit is stored. Although typically a number, this region could be identified in any of a variety of other manners. Offset field 214 stores an identifier of an offset into the particular region 206 where storage of the data for the corresponding compressed data unit begins. Alternatively, rather than region and offset identifiers, one or more fields storing any other identifier(s) of the location in the compressed portion where the corresponding compressed data unit is stored could be used.

Size field 216 stores an identifier of the size (e.g., in bytes) of the corresponding compressed data unit. Flag(s) field 218 stores various state information regarding the corresponding compressed data unit. Examples of such flags include an indication of whether the data unit has been modified (written to) while stored in data resource 106, a selection priority for the data unit (discussed in more detail below), a priority level assigned to the data unit by resource manager 102 or alternatively another application or component (discussed in more detail below), an indication of whether the data unit was accessed when the user was last logged in or last actively using system 100, which component selected or added the data unit to the compressed portion (e.g., the storage manager or the resource manager), and so forth.

It is to be appreciated that data unit map 202 is only an example. In other embodiments, additional fields can be included in each record of map 202. For example, error-detecting data such as CRC (cyclic redundancy check) data, authentication information such as HMAC (Hash Message Authentication Code) data, information describing the use history and/or frequency of the data unit, and so forth can be included in each record of map 202. Furthermore, one or more of the fields 210-218 can be omitted from the records of map 202. Additionally, it should be noted that the data in one or more of the fields 210-218 can be stored with the data on storage resource 106 of FIG. 1 rather than in a separate record.

In addition to the data unit map, storage manager 104 also maintains a region map to identify what data unit is stored in a particular location of compressed portion 110. Thus, the data unit map discussed above operates to identify where in compressed portion 110 an identified compressed data unit is stored, whereas the region map operates to identify which compressed data unit is stored in a given location of compressed portion 110.

Figure 3:
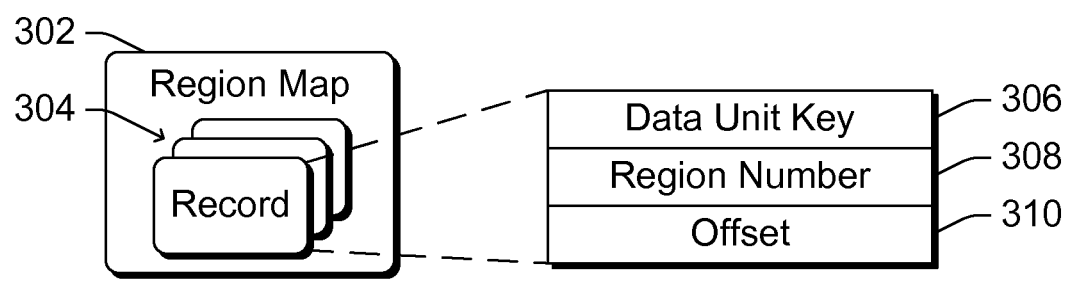
FIG. 3 illustrates an example region map in accordance with one or more embodiments.

FIG. 3 illustrates an example region map in accordance with one or more embodiments. For each offset into a region where a different data unit is stored, region map 302 maintains a record 304 identifying the corresponding compressed data unit stored at that offset. Each record 304 includes a data unit key field 306, a region number field 308, and an offset field 310.

Data unit key field 306 stores the unique identifier of the corresponding compressed data unit, analogous to data unit key field 210 of record 204 of FIG. 2. Region number field 308 stores an identifier of the particular region 206 in which the corresponding compressed data unit is stored, analogous to region number field 212 of record 204. Offset field 310 stores an identifier of an offset into the particular region 206 where storage of the data for the corresponding compressed data unit begins, analogous to offset field 214 of record 204. Alternatively, rather than region and offset identifiers, one or more fields storing any other identifier(s) of the location in the compressed portion where the corresponding compressed data unit is stored could be used.

It is to be appreciated that region map 302 is only an example. In other embodiments, additional fields can be included in each record of map 302, and/or one or more of the fields 306-310 can be omitted from the records of map 302. Additionally, it should be noted that the data in one or more of the fields 306-310 can be stored with the data on storage resource 106 of FIG. 1 rather than in a separate record.

Data unit map 202 of FIG. 2 and region map 302 of FIG. 3 can be implemented in any of a variety of different manners. In one or more embodiments, these maps are each implemented as a B+-tree for increased performance in accessing the individual records. Alternatively, any of a variety of other conventional data structures can be used to implement these maps, such as AVL trees, hash table, arrays, and so forth.

Returning to FIG. 1, storage manager 104 compresses data units prior to storing the units in compressed portion 110. Storage manager 104 can use any of a variety of different compression algorithms, including publicly available compression algorithms and/or proprietary compression algorithms. Examples of compression algorithms include run-length encoding compression algorithms, LZW compression algorithms, Huffman coding algorithms, and so forth. Storage manager 104 can optionally employ multiple different compression algorithms, such as different compression algorithms for different types of data. For example, one compression algorithm may be used for alphanumeric and/or text data, another compression algorithm may be used for image data, and another compression algorithm may be used for audio data. The compression algorithm(s) used by storage manager 104 is typically a lossless compression algorithm, although in certain circumstances (e.g., for certain image and/or audio data) a lossy compression algorithm may alternatively be used.

System 100 also includes a log 116. Storage manager 104 writes a record of any action that it takes on compressed portion 110 to log 116. Examples of such actions include writing a compressed data unit to compressed portion 110, retrieving a compressed data unit from compressed portion 110, adding a new region to compressed portion 110, deleting a region from compressed portion 110, relocating compressed data units in compressed portion 110, and so forth.

Resource manager 102 selects data units to be copied from uncompressed portion 112 to compressed portion 110. Once the compressed data unit is stored in compressed portion 110, the corresponding uncompressed data unit can be removed from uncompressed portion 112. These data units can be of any of a variety of different forms, such as memory pages, database records, and so forth.

In one or more embodiments, policy engine 114 assists resource manager 102 in selecting data units. This assistance can be, for example, hints or suggestions for data units to be selected, commands or instructions identifying data units to be selected, and so forth.

Any of a variety of different criteria can be used by resource manager 102 to select data units for storage in compressed portion 110. In one or more embodiments, policy engine 114 analyzes data access and usage patterns in system 100 and determines the appropriate data units to select based on this analysis. In alternate embodiments, different criteria can be used, such as random selection of data units.

In one or more embodiments, policy engine 114 analyzes data access and usage patterns of the data units managed by resource manager 102. This includes data units that are stored in uncompressed portion 112 and data units that are allocated to applications and/or components but are currently stored in a paging file (e.g., they have been paged out of resource 106). This can also include data units that are stored in compressed portion 110.

Policy engine 114 can access and analyze a variety of different data access and usage information. This information can be obtained from various sources, such as resource manager 102, other operating system component(s) running in system 100, an application and/or component 108, and so forth. Examples of the data access and usage information that can be used include:

- amount of time since the data unit was last accessed
- number of times the data unit has been accessed within a certain amount of time (e.g., within the past 30 minutes, within the past 2 hours, etc.)
- priority level assigned to the data unit by resource manager 102 (or alternatively assigned by some other application or component)
- compressibility of the data unit (a compression ratio that can be achieved)
- how quickly the data unit can be compressed
- whether the data unit was accessed when the user was last logged into the computer In one or more embodiments, the following rules are used by policy engine 114 to identify data units that are to be selected for storage in compressed portion 110:

1) If the data unit does not compress to a smaller size, it is not selected.
2) Data units with higher compression ratios are preferred over data units with lower compression ratios.
3) Data units that were less recently accessed are preferred over data units that were more recently accessed.
4) Data units that are less frequently accessed are preferred over data units that are more frequently accessed.
5) Data units are selected only if they have a priority level that is higher than the priority level of non-selected data units.

Regarding rule 1, data units that do not compress to a smaller size are not selected for inclusion in compressed portion 110. Some data units, such as data units that are MP3 audio or JPEG images, are already in compressed form and may not compress any more. Such data units are not selected for inclusion in compressed portion 110 because there would be little if any benefit in saving them in compressed portion 110.

Regarding rule 2, data units with higher compression ratios are preferred for inclusion in compressed portion 110 over data units with lower compression ratios. Selecting data units with higher compression ratios allows more data to be stored in compressed portion 110, thereby improving the overall efficiency of storage resource 106.

Regarding rule 3, data units that were less recently accessed are preferred for inclusion in compressed portion 110 over data units that were more recently accessed. The compression and decompression processes do involve some processing, so accessing a data unit that is in compressed portion 110 typically takes longer than accessing a data unit that is in uncompressed portion 112. As such, it is assumed that data that was more recently accessed is more likely to be accessed again in the near future, so it is preferred to keep such data in uncompressed portion 112.

Regarding rule 4, data units that are less frequently accessed are preferred for inclusion in compressed portion 110 over data units that were more frequently accessed. Similar to rule 3, since it is typically quicker to access data from uncompressed portion 112 than compressed portion 110, and it is assumed that data that is more frequently accessed is more likely to be accessed again in the near future, it is preferred to keep such data in uncompressed portion 112.

Regarding rule 5, at least some data units have priority levels assigned to them by resource manager 102 and/or another application or component of system 100. These priority levels are used, among other things, by resource manager 102 in determining which data units to keep in uncompressed portion 112 and which data units can be transferred to other storage devices (e.g., paged out to a hard disk drive). In order to avoid interfering with the management performed by resource manager 102, data units with higher priority levels are selected for inclusion in compressed portion 110 before data units with lower priority levels. This helps keep the data units with higher priority levels in storage resource 106 rather than having such data units transferred to other storage device (e.g., paged out to a hard disk drive) by resource manager 102.

In one or more embodiments, resource manager 102 combines rules 2, 3, and 4 to select the data units that are preferred for inclusion in compressed portion 110. This combination is performed by assigning selection priorities, such as numerical values, to each data unit based on the rules and then combining those selection priorities. For example, each data unit can be assigned a selection priority based on rule 2, a selection priority based on rule 3, and a selection priority based on rule 4. These three selection priorities can then be combined to obtain an overall selection priority for the data unit. The selection priorities can be combined by adding the three priorities, averaging the three priorities, weighting the different priorities prior to averaging so that one (or two) of the rules have greater impact on the overall selection priority than the other rules (or rule), and so forth.

The selection priorities can be assigned in any of a variety of different manners. For example, a fixed scale (e.g., from 1 to 10) can be used, and the 10% of the data units with the highest compression ratios are assigned a selection priority of 10 for rule 2, the 10% of the data units with the next highest compression ratios are assigned a selection priority of 9 for rule 2, and so forth. By way of another example, a dynamic scale can be assigned (e.g., from 1 to the number of data units).

Once the selection priorities are assigned, rules 1 and 5 are used to filter out any of the selected data units that should not be selected. Alternatively, this filtering process may be performed prior to the assigning of selection priorities using rules 2, 3, and 4. Resource manager 102 then notifies storage manager 104 of the selected data units, and storage manager 104 in turn retrieves the selected data units from uncompressed portion 112, compresses the selected data units, performs any additional processing on the data units, and adds them to compressed portion 110. Alternatively, resource manager 102 can retrieve the selected data units from uncompressed portion 112 and pass them to storage manager 104 rather than having storage manager 104 retrieve the selected data units from uncompressed portion 112.

The number of data units selected for addition to compressed portion 110 can vary. In one or more embodiments, compressed portion 110 is grown one region at a time, so enough data units are selected to fill (or come close to filling) one region. In such situations, the data units having the highest overall selection priority are selected. Alternatively, policy engine 114 and/or resource manager 102 can determine the number of regions to add to compressed portion 110 based on the number of selected data units. For example, all of the data units having an overall selection priority greater than a threshold value could be selected, or the data units in the top 20% based on overall selection priority could be selected. Sufficient regions would then be added to compressed portion 110 in order to accommodate this selected data.

In one or more embodiments, policy engine 114 and/or resource manager 102 determines when to add additional data units to, and thus grow, compressed portion 110. This determination can be based on various factors, such as an amount of unused space in uncompressed portion 112, on the current size of compressed portion 110, on the calculated overall selection priorities of data in uncompressed portion, and so forth.

Figure 4:
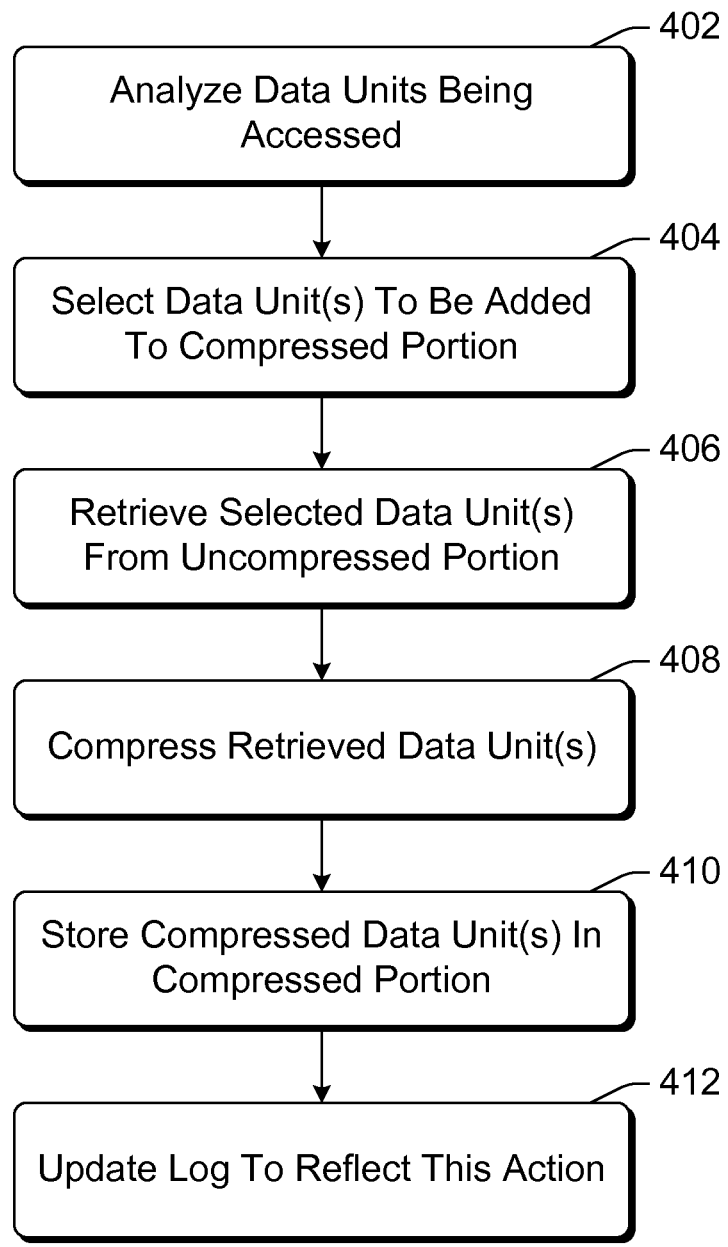
FIG. 4 is a flowchart illustrating an example process for storing data units in a compressed portion of a storage resource.

FIG. 4 is a flowchart illustrating an example process 400 for storing data units in a compressed portion of a storage resource. Process 400 is carried out by a storage manager (such as storage manager 104 of FIG. 1), a resource manager (such as resource manager 102 of FIG. 1), and/or a policy engine (such as policy engine 114 of FIG. 1). Process 400 can be implemented in software, firmware, hardware, or combinations thereof. Process 400 refers to the compressed portion of the storage resource, such as portion 110 of FIG. 1. It should be noted that process 400 is performed automatically; user input regarding when to perform process 400 and/or to select data units is not needed.

Initially, the data units being accessed in the storage resource are analyzed (act 402). These data units are analyzed using any of a variety of different data access and usage information, as discussed above. Based on this analysis, the data unit(s) to be added to the compressed portion are selected (act 404). How many data units are added to the compressed portion can vary based on the amount of space available in the compressed portion. In one or more embodiments, the number of data units is selected so as to completely fill (or close to completely fill) the compressed portion, due to the efficiency of the compressed portion improving the fuller it becomes. It should also be noted that the size of the compressed portion can by dynamically changed, as discussed in more detail below.

The selected data unit(s) are then retrieved from the uncompressed portion (act 406), and compressed (act 408). The compressed data unit(s) are then stored in the compressed portion (act 410), and the log is updated to reflect this storage of the compressed data unit(s) in the compressed portion (act 412).

Process 400 can be performed at different times. For example, process 400 may occur at regular or irregular intervals. By way of another example, process 400 may occur whenever there is free space in the compressed portion (e.g., due to a data unit(s) being removed from the compressed portion, due to an increase in size of the compressed portion, etc.).

Returning to FIG. 1, storage manager 104 also dynamically resizes compressed portion 110. Storage manager 104 can control the size of compressed portion 110 by having additional parts of storage resource 106 allocated to it by resource manager 102, thereby increasing the size of portion 110. Storage manager 104 can also release one or more regions of compressed portion 110, thereby decreasing the size of portion 110. As uncompressed portion 112 and compressed portion 110 are part of the same storage resource 106, as compressed portion 110 increases in size uncompressed portion 112 decreases in size, and as compressed portion 110 decreases in size uncompressed portion 110 increases in size.

Storage manager 104 and/or policy engine 114 analyze resource pressure in system 100 and can reduce the size of compressed portion 110 in response to the results of this analysis. The resource pressure in system 100 refers to the demand for storage resource 106. As the demand for storage resource 106 increases, so too does the resource pressure in system 100. In situations where storage resource 106 is RAM, this resource pressure is also referred to as memory pressure.

Storage manager 104 can monitor the resource pressure in system 100 in any of a variety of different ways. For example, resource manager 102 may notify storage manager 104 when resource manager 102 determines that resource pressure has grown too much and send out a request to storage manager 104 to release some of resource 106. By way of another example, policy engine 114 may monitor the resource usage and, based on past behavior, identify when resource pressure has grown too much. When resource pressure has grown too much, policy engine 114 notifies storage manager 104 to decrease the size of compressed portion 110.

Policy engine 114 can monitor the memory pressure on resource 106 in a variety of different manners. In one or more embodiments, policy engine 114 monitors a page cache maintained by resource manager 102. As discussed above, in certain embodiments resource manager organizes resource 106 into pages and can store some of those pages onto another device (e.g., a hard disk drive). Resource manager 102 typically maintains a table or other record of which pages are stored on this other device. If the number of pages that are stored on this other device grows beyond a threshold amount, policy engine 114 determines that resource pressure has grown too much. Alternatively, policy engine 114 can determine that resource pressure has grown too much in other manners, such as based on an amount of unused space in uncompressed portion 112, a size of compressed portion 110 relative to uncompressed portion 112, a frequency with which resource manager 102 needs to obtain data that has been paged to disk, and so forth.

In one or more embodiments, the determination of whether resource pressure has grown too much is made by comparing the resource pressure to a threshold. If the threshold is exceeded, then resource pressure has grown too much. The threshold can be, for example, a fixed or variable amount describing the unused space in uncompressed portion 112 (e.g., the unused space drops below 256 megabytes, or below 10% of the size of the uncompressed portion). When storage resource 106 is a cache, the threshold can be set based on the cache miss/churn rate due to the replacement policy (e.g., at least 10% of uncompressed portion 112 is churned in one second).

When decreasing the size of compressed portion 110, situations typically arise where storage manager 104 determines one or more compressed data units to be released from compressed portion 110. In one or more embodiments, released data units are decompressed and returned to resource manager 102. Resource manager 102 then determines how to handle the released data units, such as by storing them in uncompressed portion 112 or paging them out to another storage device. Alternatively, storage manager 104 may delete the released data units from storage resource 106 and may notify resource manager 102 of which data units were released so that resource manager 102 knows those data units are no longer stored in storage resource 106.

When selecting data units for release, storage manager 104 and/or policy engine 114 can take into account any of the data access and usage information discussed above. The same criteria that are used to determine which data units are to be added to compressed portion 110 can also be used to determine which data units are to stay in compressed portion 110.

Storage manager 104 also optionally imposes a minimum size for compressed portion 110. This size can vary, and can be a fixed value (e.g., a minimum of 1 megabyte), or alternatively a dynamic value (e.g., a minimum of 5% of storage resource 106).

In addition to reducing the size of compressed portion 110, storage manager 104 can also increase the size of compressed portion 110. In one or more embodiments, storage manager 104 has a desired size of compressed portion 110. This size can be a fixed size (e.g., 512 megabytes or 25% of storage resource), or alternatively a dynamic value. In one or more other embodiments, storage manager 104 attempts to grow compressed portion 110 as large as possible, ceasing only when it determines that resource pressure in system 100 has grown beyond a threshold amount. Alternatively, various other criteria can be used to determine how large to grow compressed portion 110. For example, storage manager 104 can attempt to grow compressed portion 110 so that all the data units having at least a particular priority level or selection priority are stored in compressed portion 110. It should be noted, however, that storage manager 104 grows compressed portion 110 as data units are added to compressed portion 110. Having a large amount of space in compressed portion 110 that does not store any data units reduces the efficiencies gained by using compressed portion 110, and thus storage manager 104 attempts to avoid such situations.

In one or more embodiments, storage manager 104 also manages the storage of particular data units into particular regions of compressed portion 110 in a manner that facilitates decreasing the size of compressed portion 110. For example, selection priorities and/or priority levels can be assigned to data units as discussed above. Data units having the same selection priorities and/or priority levels can be stored in the same region(s), thereby allowing particular regions to be more easily released without having to re-locate data units into different regions.

Storage manager 104 can determine whether to resize compressed portion 110 at different times. For example, storage manager 104 may make the determination at regular or irregular intervals. By way of another example, storage manager 104 may make the determination in response to different events in system 100, such as beginning execution of a new application, terminating execution of an application, and so forth.

Figure 5:
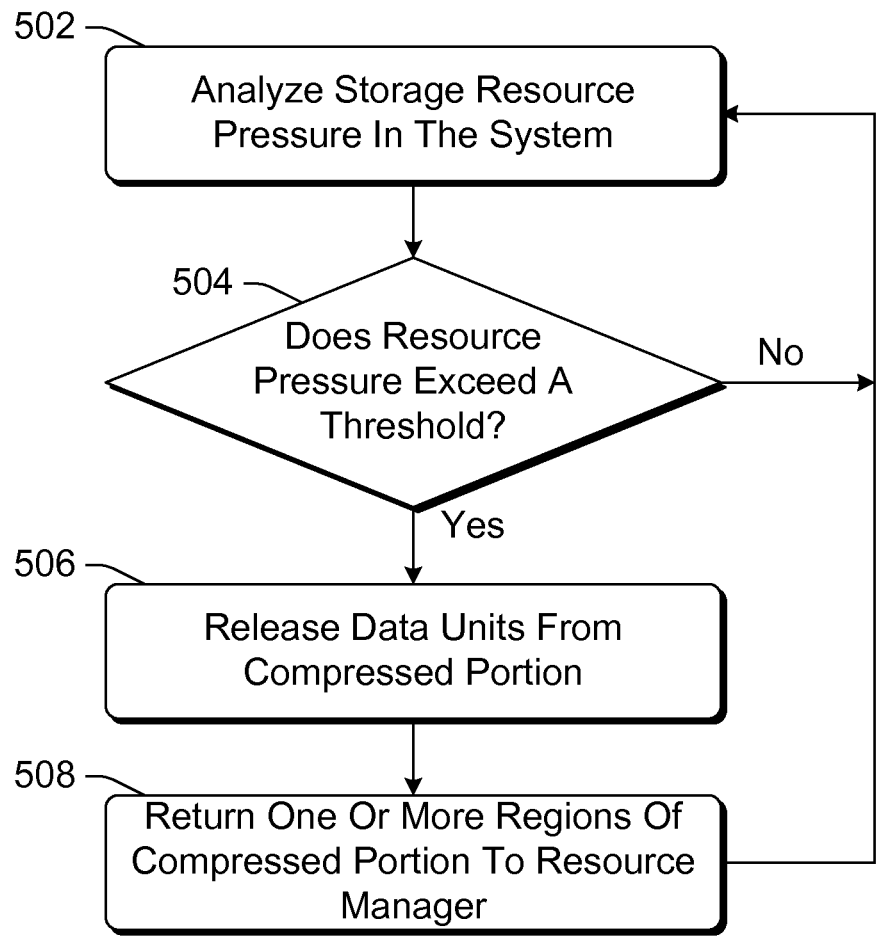
FIG. 5 is a flowchart illustrating an example process for reducing the size of a compressed portion.

FIG. 5 is a flowchart illustrating an example process 500 for reducing the size of a compressed portion. Process 500 is carried out by a storage manager, such as storage manager 104 of FIG. 1, optionally with the assistance of a policy engine, such as policy engine 114 of FIG. 1. Process 500 can be implemented in software, firmware, hardware, or combinations thereof. Process 500 refers to the compressed portion of the storage resource, such as portion 110 of FIG. 1.

Initially, the storage resource pressure in the system is analyzed (act 502), and a determination is made as to whether the resource pressure exceeds a threshold (act 504). This analysis and determination can be made in a variety of different manners, as discussed above. If the resource pressure does not exceed the threshold, then process 500 returns to analyze the resource pressure in the system again at a later time.

However, if the resource pressure does exceed the threshold, then data units are released from the compressed portion (act 506). As discussed above, this release can be performed in a variety of different manners. The number of data units released can vary. In one or more embodiments, policy engine 114 determines, as part of determining that resource pressure in the system exceeds the threshold, how many data units are to be released in order to relieve the resource pressure. In one or more other embodiments, a certain number of data units are released (e.g., enough data units so that one region can be emptied and the corresponding memory returned to control of resource manager 102 of FIG. 1).

One or more regions of the compressed portion are then returned to the resource manager (act 508). The data units from any of these regions that are returned to the resource manager were released in act 506. A region can be returned to the resource manager in a variety of manners, such as storage manager 104 sending a notification to the resource manager that the region is no longer being used, and in response resource manager deallocating the portion of the storage resource that included that region from storage manager 104.

Returning to FIG. 1, storage manager 104 also compacts compressed portion 110. Over time, data units that were stored in compressed portion 110 can be removed from portion 110. Such removals can occur for a variety of reasons. For example, an application may request access to a data unit that is stored in compressed portion 110. In response to such a request, storage manager 104 removes the data unit from compressed portion 110 and decompresses the data unit, then transfers the data unit to resource manager 102 for storage in uncompressed portion 112.

Removal of data units from compressed portion 110 results in empty gaps or blocks within regions of compressed portion 110. During the compaction process, storage manager 104 consolidates the remaining units so that these empty gaps or blocks are filled. If the units remaining in a particular region can be relocated to the empty gaps or blocks in other regions, then that particular region can be released back to resource manager 102 so that it becomes part of uncompressed portion 112.

Storage manager 104 (or alternatively policy engine 114) keeps track of how well compressed portion 110 is being utilized. A value representing how well compressed portion 110 is being utilized is determined based on how much data is stored in compressed portion 110 (e.g., the summation of the sizes of all the compressed data units stored in portion 110) and how much space is allocated to compressed portion 110 (e.g., the size of portion 110). If the difference or ratio of these two values exceeds a threshold value, then storage manager 104 (or alternatively policy engine 114) determines that compaction should be performed. This compaction threshold value can be a fixed or variable amount, such as the size of a region, 10% of the size of the compressed portion, and so forth. In other embodiments, compaction is performed whenever there are any empty gaps or blocks in any of the regions of compressed portion 110.

Compaction is performed by relocating data units from one region to another. The size of the various data units in each region can be readily determined by accessing the data structures for compressed portion 110 that are maintained by storage manager 104 (e.g., as discussed above with respect to FIG. 3). In one or more embodiments, data units within a particular region are compacted together (e.g., at the beginning or ending of the region) so that all of the empty gaps in that region are together. This can result in a larger gap in a region rather than several smaller gaps, and allow for a larger data unit to be relocated within that region. Alternatively, such intra-region compaction may not be performed, and data units may simply be relocated into the existing gaps in regions.

Compaction can result in the data units from a region(s) being relocated to one or more other regions, and thus emptying the region. Once emptied, the region can be returned to resource manager 102 for inclusion in uncompressed portion 112.

The determination of which data units are to be relocated into which regions can be made in any of a variety of manners. For example, data units from the region having the most empty gaps (and thus the smallest amount of data in its data units) can be selected for relocation first as storage manager 104 is more likely to be able to relocate all the data units from that region into other regions. By way of another example, larger data units may be selected first to avoid filling larger gaps with smaller data units. By way of another example, the data units are selected for relocation so as to reduce the amount of copying from one region to another. By way of yet another example, the age of regions may be taken into account in determining which data units are to be relocated. The age of a data unit refers to an amount of time that the data unit has been in compressed portion 110. The age of a region refers to, for example, the average, maximum, and/or minimum age of the data units in that region.

The threshold value for compaction can be a fixed amount (e.g., no more than 25% of the size of compressed portion 110 should be empty gaps), or alternatively can be a dynamic amount. This dynamic amount can vary based on different criteria, such as the compressibility of data units stored in compressed portion 110 (better compressibility of data units could increase the empty gaps permitted in portion 110), the resource pressure in system 100 (higher pressure could reduce the empty gaps permitted in portion 110), and so forth. Various other criteria regarding a current state of system 100 can also be used in varying the threshold value for compaction, such as hit rates (how frequently data units in compressed portion 110 are accessed), time of day or other user context (e.g., early morning, during lunch, after lunch, etc.), battery life, and so forth. For example, if processor usage is very high, the empty gaps permitted in portion 110 can be increased in order to reduce the burden of the processor in relocating data units. By way of another example, if the power state in system 100 indicates that power should be conserved, or if the battery level is low, then the empty gaps permitted in portion 110 can be increased in order to reduce the power consumption of the processor by requiring fewer data units to be relocated.

Storage manager 104 can determine whether to compact compressed portion 110 at different times. For example, storage manager 104 may make the determination at regular or irregular intervals. By way of another example, storage manager 104 may make the determination in response to different events in system 100, such as the processor being idle for a threshold amount of time, an indication that resource pressure in system 100 is growing, and so forth.

Figure 6:
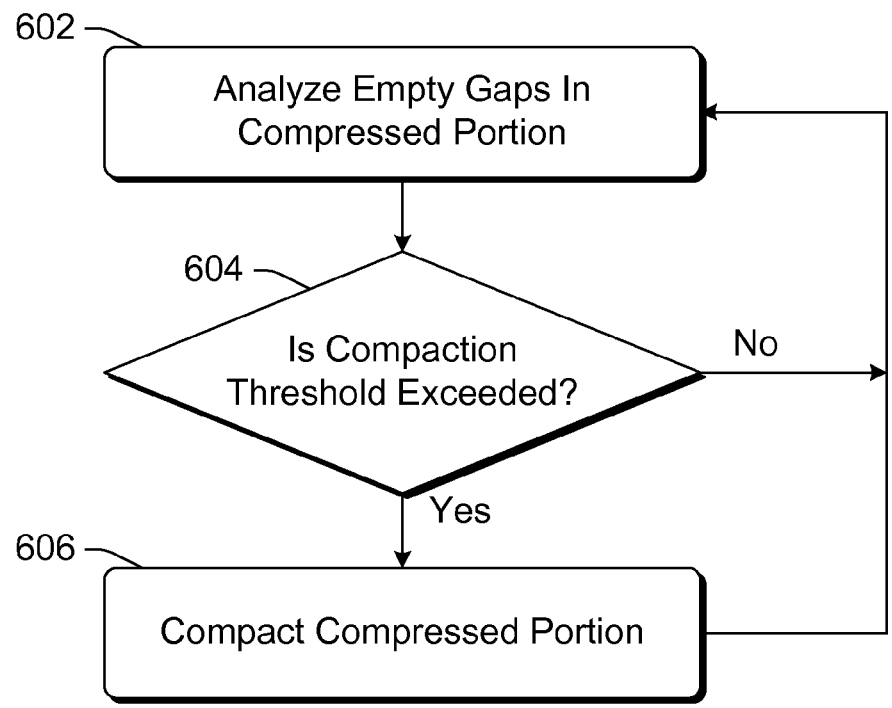
FIG. 6 is a flowchart illustrating an example process for compacting a compressed portion.

FIG. 6 is a flowchart illustrating an example process 600 for compacting a compressed portion. Process 600 is carried out by a storage manager, such as storage manager 104 of FIG. 1, optionally with the assistance of a policy engine, such as policy engine 114 of FIG. 1. Process 600 can be implemented in software, firmware, hardware, or combinations thereof. Process 600 refers to the compressed portion of the storage resource, such as portion 110 of FIG. 1.

Initially, empty gaps in the compressed portion are analyzed (act 602). This analysis provides an indication of how well the compressed portion is being utilized. This analysis can be performed by analyzing the data structures discussed above (e.g., records 204 of FIG. 2 and/or records 304 of FIG. 3). Alternatively, this analysis can be performed based on other records kept during runtime, these records keeping track of empty gaps in the compressed portion as the data units are stored in, and retrieved from, the compressed portion.

A value representing how well the compressed portion is being utilized is generated as part of the analysis of act 602, and in turn is used to determine whether a compaction threshold is exceeded (act 604) as discussed above.

If the compaction threshold is not exceeded, then process 600 returns to analyze the empty gaps in the compressed portion again at a later time. However, if the compaction threshold is exceeded, then the compressed portion is compacted (act 606) as discussed above. The number of regions that are freed due to the compaction can vary. In one or more embodiments, policy engine 114 or storage manager 104 determines, as part of acts 602 and 604, how many regions are to be released so that the compaction threshold is no longer exceeded. In one or more other embodiments, a certain number of regions (e.g., one) are released.

Returning to FIG. 1, storage manager 104 can optionally expose a user interface to allow a user of system 100 to see, and optionally manipulate, the actions being performed by storage manager 104. Such a user interface could allow the user to see how much of resource 106 is allocated to manager 104 for compressed portion 110, and optionally could allow the user to change how much of resource 106 is allocated to manager 104 for compressed portion 110. Such a user interface could also display various other information, such as the threshold values discussed above, to the user, and could also allow the user to alter various values, such as any of the threshold values discussed above. Various other aspects could be controlled by user inputs via this user interface, such as criteria describing what data units should be added to compressed portion 110 (e.g., by identifying how data units should be selected for adding to compressed portion 110), what compression algorithm(s) should be used, how aggressive compaction should be (e.g., by setting compaction threshold values), and so forth.

Figure 7:
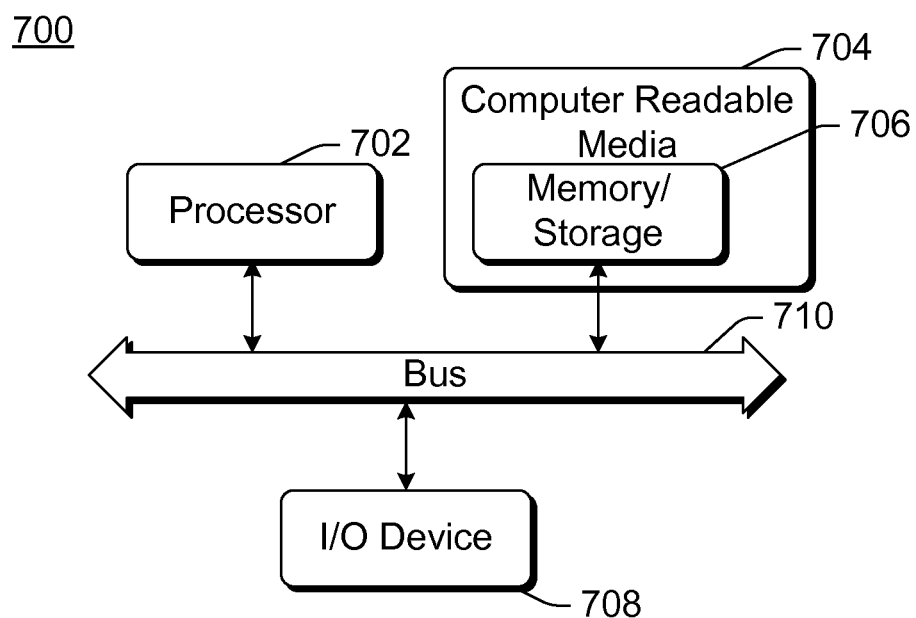
FIG. 7 illustrates an example computing device that can be configured to implement the compressed storage management in accordance with one or more embodiments.

FIG. 7 illustrates an example computing device 700 that can be configured to implement the compressed storage management in accordance with one or more embodiments. Computing device 700 can be, for example, system 100 of FIG. 1, or can implement any of the processes discussed herein.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or I/O device(s) 708 can be included as part of, or alternatively may be coupled to, computing device 700. Bus 710 represents one or more of any of several types of bus structures, including a memory bus or memory controller, a peripheral bus, an accelerated graphics port, and a processor or local bus using any of a variety of bus architectures. Bus 710 can include wired and/or wireless buses.

Memory/storage component 706 represents one or more computer storage media. Component 706 can include volatile media (such as random access memory (RAM)) and/or nonvolatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth). Computer storage media can also be included in other components of device 700, for example as one or more cache memories of processor 702.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer storage media having stored thereon multiple instructions to manage a storage resource in a system, the multiple instructions, when executed by one or more processors in the system, causing the one or more processors to:
    assign a selection priority and a priority level to multiple data units stored in an uncompressed portion of the storage resource;
    compress one or more data units of the multiple data units;
    store the compressed one or more data units in respective regions of a compressed portion of the storage resource, the regions being contiguous in the compressed portion, each of the regions storing data units having a same selection priority or a same priority level; and
    determine that a compaction threshold of the compressed portion is exceeded and in response, compact one or more of the regions of the compressed portion of the storage resource to fill empty gaps in the compressed portion.

2. One or more computer storage media as recited in claim 1, the multiple instructions further causing the one or more processors to:
    return one or more of the regions of the compressed portion for use in the uncompressed portion in response to storage resource system pressure; and
    decompress the compressed one or more data units from the one or more regions.

3. One or more computer storage media as recited in claim 1, the multiple instructions further causing the one or more processors to return at least one of the regions of the compressed portion for use in the uncompressed portion without relocating the one or more data units in the at least one region into other regions.

4. One or more computer storage media as recited in claim 1, the multiple instructions further causing the one or more processors to select the one or more data units of the multiple data units for compression, wherein the priority level of the one or more data units selected for compression is higher than the priority level of non-selected data units.

5. One or more computer storage media as recited in claim 1, the multiple instructions further causing the one or more processors to select one or more data units from the storage resource for removal from the storage resource, wherein the priority level of the one or more data units from the storage resource selected for removal is lower than the priority level of non-selected data units.

6. One or more computer storage media as recited in claim 1, the multiple instructions further causing the one or more processors to compress the one or more data units of the multiple data units and store the one or more compressed data units to the compressed portion for, one of the regions at a time.

7. One or more computer storage media as recited in claim 1, wherein a size of the compressed portion is configured to dynamically increase in response to storing the compressed one or more data units or to dynamically decrease in response to returning one or more data units from at least one of the regions of the compressed portion for use in the uncompressed portion.

8. One or more computer storage media as recited in claim 1, wherein the selection priority is assigned to a single data unit of the multiple data units based at least in part on:
    whether the single data unit can be compressed to a smaller size;
    a compression ratio of the single data unit;
    how recently the single data unit was most recently accessed; and
    how frequently the single data unit was accessed.

9. One or more computer storage media as recited in claim 1, wherein to compact the one or more regions of the compressed portion, the multiple instructions further causing the one or more processors to includes at least one of:
    relocate the compressed data units from a first region of the one or more regions into at least a second region of the one or more regions, and return the first region for use in the uncompressed portion if the first region is empty; and
    relocate the compressed data units within the first region.

10. A computing device comprising:
    a storage resource configured with an uncompressed portion and a compressed portion; and
    a storage manager configured to:
        assign a selection priority and a priority level to multiple data units stored in the uncompressed portion of the storage resource;
        compress one or more of the multiple data units;
        store the compressed one or more data units in respective regions of the compressed portion of the storage resource, the regions being contiguous in the compressed portion, each of the regions storing data units having a same selection priority or a same priority level; and determine that a compaction threshold of the compressed portion is exceeded and in response, compact one or more of the regions of the compressed portion of the storage resource to fill empty gaps in the compressed portion.

11. A computing device as recited in claim 10, wherein the storage manager is further configured to:
   return one or more of the regions of the compressed portion for use in the uncompressed portion in response to storage resource system pressure; and
   decompress the compressed one or more data units from the one or more regions.

12. A computing device as recited in claim 11, further comprising a policy engine configured to determine, in response to the compaction threshold being exceeded, how many of the regions of the compressed portion are to be returned to the uncompressed portion so that the compaction threshold is no longer exceeded.

13. A computing device as recited in claim 10, wherein the storage manager is further configured to return at least one of the regions of the compressed portion for use in the uncompressed portion without relocating the compressed one or more data units in the at least one region into different regions.

14. A computing device as recited in claim 10, wherein the storage manager is further configured to select the one or more data units of the multiple data units for compression, wherein the priority level of the one or more data units selected for compression is higher than the priority level of non-selected data units.

15. A computing device as recited in claim 10, wherein the selection priority is assigned to a single data unit of the multiple data units based at least in part on:
   whether the single data unit can be compressed to a smaller size;
   a compression ratio of the single data unit;
   how recently the single data unit was most recently accessed; and
   how frequently the single data unit was accessed.

16. A computing device as recited in claim 10, wherein the storage manager is further configured to expose a user interface to receive input from a user to:
   control how much of the storage resource is allocated to the storage manager for use as the compressed portion;
   describe what data units the storage resource should store in the compressed portion; and
   identify a compaction threshold value to be used by the storage manager to determine when to compact the regions in the compressed portion.

17. A computer-implemented method comprising:
   compressing selected data units of multiple data units to generate compressed data units in a storage resource, each of the multiple data units having a selection priority and a priority level;
   storing the compressed one or more data units in respective regions of a compressed portion of the storage resource, the regions being contiguous in the compressed portion, each of the regions storing the compressed data that have a same selection priority or a same priority level;
   determining that a compaction threshold of the compressed portion is exceeded; and
   compacting one or more of the regions of the compressed portion of the storage resource to fill empty gaps in the compressed portion.

18. A computer-implemented method as recited in claim 17, wherein the selected data units are selected and compressed to be stored in a first region of the storage resource before additional data units are selected and compressed to be stored in a second region of the storage resource.

19. A computer-implemented method as recited in claim 17, further comprising compacting the one or more regions of the compressed portion of the storage resource by at least one of relocating the compressed data units within a first region of the storage resource or relocating the compressed data units from the first region into one or more different regions of the storage resource.

20. A computer-implemented method as recited in claim 17, further comprising analyzing a storage pressure of the storage resource, and in response to the storage pressure exceeding a threshold amount, releasing the compressed data units in one or more of the regions of the storage resource.

* * * * *